United States Patent [19]
Stevens

[11] Patent Number: 5,168,936
[45] Date of Patent: Dec. 8, 1992

[54] TRAILING HARROW ROTATABLE TO AN UP-SIDE-DOWN STORAGE POSITION

[75] Inventor: Phillip E. Stevens, Ankeny, Iowa

[73] Assignee: Deere & Company, Moline, Ill.

[21] Appl. No.: 769,306

[22] Filed: Oct. 1, 1991

[51] Int. Cl.⁵ .............................................. A01B 23/00
[52] U.S. Cl. ................................... 172/662; 172/198; 172/640; 172/739
[58] Field of Search ................ 172/34, 142, 195, 197, 172/198, 249, 640, 643, 662, 683, 705, 707, 739

[56] References Cited

U.S. PATENT DOCUMENTS

| 2,736,252 | 2/1956 | Latshaw | 172/643 |
| 3,100,018 | 8/1963 | Sokolowski | 172/198 X |
| 3,500,936 | 3/1970 | Vigen | 172/198 |
| 5,042,587 | 8/1991 | Halfmann | 172/662 X |

FOREIGN PATENT DOCUMENTS

| 1285015 | 1/1962 | France | 172/136 |
| 1514070 | 1/1968 | France | 172/662 |

OTHER PUBLICATIONS

"Emmert Tine Mulcher" Sales Brochure, Emmert Mfg. Co., Inc., Sep. 1979.

Primary Examiner—Randolph A. Reese
Assistant Examiner—Jeffrey L. Thompson

[57] ABSTRACT

A trailing harrow attachment is pivotally connected to the aft end of support arms for rotation about a transverse axis between a field-working position wherein the harrow tines engage the soil, and a non-operative position wherein the harrow is rotated about the axis by approximately 180° so that the tines extend away from the ground to provide better trash flow and ground clearance. The angles that attach the harrow to the trailing arms include apertures located an equal distance radially outwardly on opposite sides of the axis so that the harrow may be pinned at the same location on one of the support arms in either the field-working or the non-operative position.

7 Claims, 2 Drawing Sheets

TRAILING HARROW ROTATABLE TO AN UP-SIDE-DOWN STORAGE POSITION

BACKGROUND OF THE INVENTION

1) Field of the Invention

The present invention relates generally to agricultural tillage implements such as field-cultivators and chisel plows, and more specifically to a trailing leveling attachment for such implements that can be moved between an operative ground-engaging position and a non-operative or storage position.

2) Related Art

Harrows are commonly supported rearwardly of ground-working implements to break up clods and level the soil. Such a harrow is described in U.S. Pat. No. 4,304,306 and includes a plurality of fore-and-aft spaced channels or bars which carry spring tines. The channels are connected to a pair of brackets which in turn are connected to a pair of support arms pivotally connected to the rear of the implement main frame. The support arms are biased downwardly to an adjustable lowermost position above the ground by tension springs connected between the brackets and main frame to maintain the harrow in contact with the soil.

When use of the harrow is not necessary, placing the attachment in a non-working position has typically involved lifting the entire attachment against the bias of the springs and placing a pin, bracket, strap or cam adjacent the support arm to main frame connection to maintain the support arm in an upwardly rotated position. Such an operation can require a considerable amount of effort on the part of the operator. In addition, when the harrow is in the non-working position, the tines depend downwardly to reduce the vertical trash and transport clearances behind the main implement. The down-pressure springs are usually highly tensioned when the attachment is in the non-working position.

BRIEF SUMMARY OF THE INVENTION

It is therefore an object of the present invention to provide an improved leveling attachment for a ground-working implement. It is a further object to provide such an implement which overcomes the aforementioned problems.

It is yet another object to provide an improved harrow or similar leveling attachment for a ground-working implement which is easily moved between field-working and non-operative positions. It is a further object to provide such an attachment which has substantial ground clearance in the non-operative position and yet which does not require the operator to lift the weight of the attachment or move supporting arms against the bias of down pressure springs. It is still a further object to provide such an attachment which rotates the harrow tines away from the ground for better ground clearance and trash flow when the harrow is not in use.

A trailing harrow attachment is pivotally connected to the aft end of support arms for rotation about a transverse axis between a field-working position wherein the harrow tines engage the soil, and a non-operative position wherein the harrow is rotated about the axis by approximately 180° so that the tines extend away from the ground to provide better trash flow and ground clearance. Angle brackets that attach the harrow to the trailing arms include apertures located an equal distance radially outwardly on opposite sides of the axis so that the harrow may be pinned at the same location on one of the support arms in either the field-working or the non-operative position. Rotating rather than raising the harrow to the non-operative position eliminates the need for the operator to lift the weight of the harrow or to work against the bias of the down pressure springs. Securing the harrow in position is much easier and faster than with at least most previously available harrow attachments, and added tension on the down-pressure springs during non-use is eliminated.

These and other objects, features and advantages of the present invention will become apparent to one skilled in the art upon reading the following detailed description in view of the drawings.

DETAILED DESCRIPTION OF THE DRAWINGS

Figure 1:
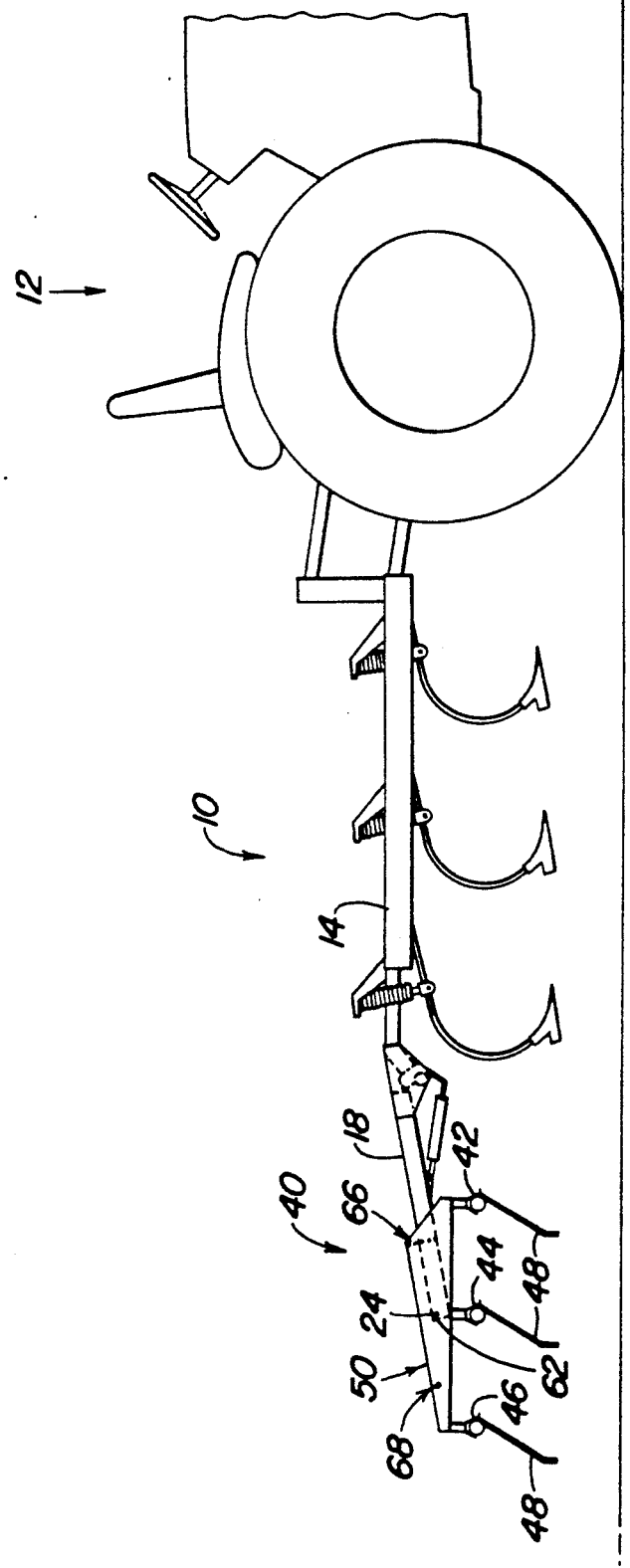
FIG. 1 is a side view of a harrow attachment connected to a tillage implement.

Referring now to FIG. 1, therein is shown a tillage implement 10 connected to a tractor 12 for movement forwardly over the ground. The implement 10 includes a frame 14 having a rear frame section 14a (FIG. 2) supporting the forward ends of transversely spaced fore-and-aft extending support arms 18 which are pivotally connected to the frame by frame brackets 22. The support arms 18 are rectangular in cross-section and include aft ends 24 supported above the ground by the brackets 22. The brackets 22 include down limiting stops 26, and the angle of the arms 18 relative to the frame 14 may be adjusted by the stops for different operating conditions. The arms 18 move vertically with the frame 14 as the implement 10 is raised and lowered. A down pressure spring 30 is tensioned between the bracket 22 and the central portion of the arm 18 for yieldingly biasing the arm toward the lowermost adjusted position. When the implement 10 is raised to a transport position (FIG. 1), the ends 24 of the arms 18 are supported in a position substantially offset from the surface of the ground.

A harrow 40 is supported by the arms 18 rearwardly of the implement 10 for leveling soil and breaking up clods. The harrow 40 includes a plurality of fore-and-aft spaced channels 42, 44, and 46 (FIG. 2), each carrying spring tines 48. The channels are supported in parallel, evenly spaced rows by angle bracket assemblies 50 which include angles 52 having upright, transversely spaced walls 56, and outwardly directed flanges 58. The channels 42–46 are supported from the flanges 58 in a suitable manner, such as shown in the aforementioned U.S. Pat. No. 4,304,306 or by a conventional angle adjusting mechanism (not shown) for varying the angle of the tines 48. The bracket assemblies 50 and channels 42–46 define a generally rectangular harrow frame.

Figure 2:
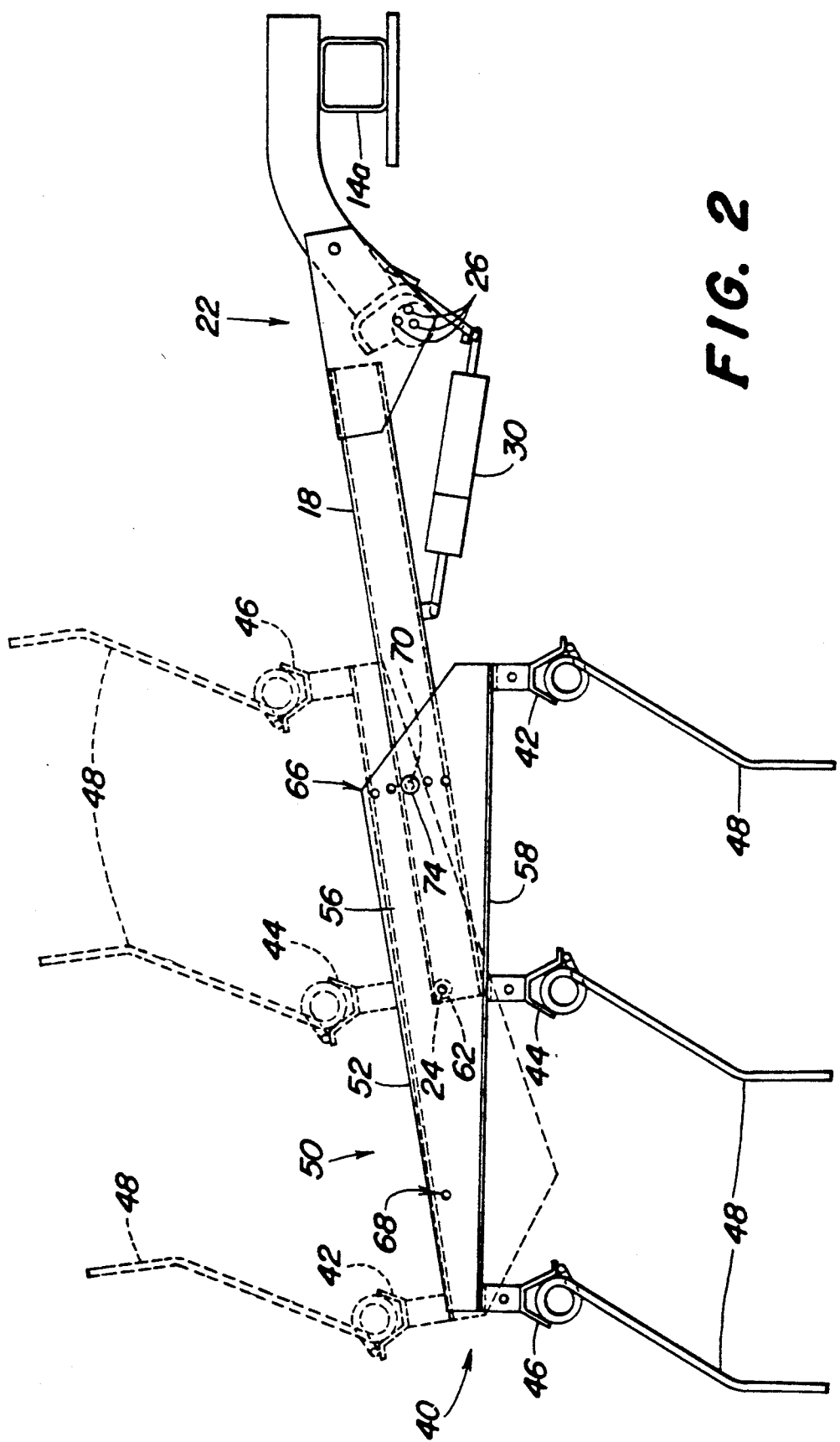
FIG. 2 is an enlarged side view of the attachment of FIG. 1, showing the attachment in the field-working position (solid lines) and in the non-operative position (broken lines).

The spacing between the bracket walls 56 is approximately equal to the distance between the side walls of the support arms 18, and a bushing assembly 62 pivotally connects each bracket assembly 50 at a location above the middle channel 44 (FIG. 2) to the aft end 24 of a corresponding support arm 18. The walls 56 generally embrace the support arm side walls and facilitate rocking of the bracket assembly about a transverse axis through an angle of at least approximately 180°. The bracket assemblies are apertured at diametrically opposed locations 66 and 68 forwardly and rearwardly of the axis at equal radial distances from the axis. An aperture 70 extends through the support arm 18 at the same radial distance from the axis so that the apertures in the bracket assembly 50 will align with the aperture 70 as the bracket assembly is rotated. A pin 74 secures the bracket assembly 50 in either the field-working (solid lines of FIG. 2) or the non-operative (broken lines of FIG. 2) position. Additional apertures are provided in the bracket assembly 50 at location 66 which are spaced on an arc of a circle centered on the pivot axis so that, as best seen in FIG. 2, the angle of the harrow 40 may be adjusted for different operating conditions.

The space between the angles 52 is open and unencumbered between the bracket walls 56 so that the bracket assembly 50 is free to rotate with the channels 42-46 in the clockwise direction (as viewed in FIG. 2) from a first limit position wherein the forward channel 42 is closely adjacent the bottom of the arm 18, to a second limit position (broken lines) wherein the rear channel 46 is closely adjacent the upper surface of the arm 18. The transverse pivot axis is on or very close to the center of the harrow 40 in the fore-and-aft direction so that the vertical space required to rotate the harrow between positions is minimized and the aft location of the harrow is generally the same in either position. Rotation of the harrow 40 can be accomplished when the implement 10 is raised (FIG. 1) without having to lift the arm 18 against the bias of the spring 30. In addition, the pivot axis is close to the center of gravity of the harrow 40 so that minimum effort is required to rotate the harrow between positions.

Having described the preferred embodiment, it will become apparent that various modifications can be made without departing from the scope of the invention as defined in the accompanying claims.

I claim:

1. In a tillage implement having a main frame adapted for forward movement over the ground and movable between a raised transport position and a lowered field-working position, a selectively positionable leveling attachment comprising:

a fore-and-aft extending support arm connected to and extending rearwardly from the main frame and movable vertically with the main frame;

a transversely extending harrow including a harrow frame having forward and aft extremities, and a plurality of tine members supported from the harrow;

means rotatably supporting the harrow frame from the support arm for rotation with respect to the arm about a transverse axis centrally located in the fore-and-aft direction relative to the harrow frame and fixed in the fore-and-aft direction relative to the main frame of the tillage implement, the harrow frame rotatable, when the main frame is in the raised transport position, through an angle of substantially greater than ninety degrees between a normal operating position wherein the tines extend downwardly and engage the soil when the main frame is in the field-working position, and an up-side-down position wherein the tines are substantially offset from the ground when the main frame is in the field-working position, wherein the space below the harrow frame is open and unencumbered when the harrow is in the up-side-down position to thereby provide substantial clearance between the ground and the harrow in both the raised and lowered positions of the main frame; and means for releasibly securing the harrow frame against rotation relative to the support arm when the harrow frame is in the up-side-down position.

2. The invention as set forth in claim 1 wherein the means rotatably supporting the harrow frame includes a transverse pivot centrally located in the fore-and-aft direction relative to the harrow frame and the angle that the harrow frame rotates through is approximately 180° so that the harrow extends substantially the same distance rearwardly of the main frame in both the field-working and up-side-down positions.

3. The invention as set forth in claim 1 wherein the harrow comprises a forward row, a central row, and an aft row of tines and the means rotatably supporting includes a pivot lying on the transverse axis, the pivot located above the central row of tines when the harrow frame is in the field-working position and below the tines when the harrow frame is in the up-side-down position.

4. The invention as set forth in claim 1 wherein the harrow frame comprises a bracket assembly, the means for releasibly securing the harrow frame includes a pin and the bracket assembly includes at least two apertures located radially outwardly an equal distance from the pivot axis on opposite fore-and-aft sides of the pivot axis for receiving the pin in one of the apertures when the harrow is in the field-working position and in the opposite aperture when the harrow is in the up-side-down position.

5. In a tillage implement having a main frame adapted for forward movement over the ground and movable between a raised transport position and a lowered field-working position, a selectively positionable harrow attachment comprising:

a fore-and-aft extending support arm connected to and extending rearwardly from the main frame and movable vertically with the main frame;

a transversely extending harrow including a harrow frame having forward and aft extremities, and a plurality of tine members supported from the harrow frame;

means rotatably supporting the harrow frame from the support arm for rotation with respect to the arm about a transverse axis through an angle of approximately 180° between a normal operating position wherein the tines extend downwardly and engage the soil when the main frame is in the field-working position, and an up-side-down position wherein the tines are substantially offset from the ground when the main frame is in the field-working position, the means rotatably supporting including an apertured angle bracket fixed to the harrow frame, the apertures in the angle bracket located an equal preselected distance radially outwardly on opposite fore-and-aft sides of the axis; and means for releasibly securing the harrow frame against rotation relative to the support arm including a portion of the support arm located said preselected distance forwardly from the axis for alignment with one of the angle bracket apertures when the harrow frame is in the field-working position and with the opposed angle bracket aperture when the harrow frame is in the up-side-down position.

6. The invention as set forth in claim 5 wherein said portion of the support arm includes an aperture, and the means releasibly securing includes a pin insertible into the aperture when either of the angle bracket apertures is aligned with the portion of the support arm.

7. The invention as set forth in claim 6 wherein the angle bracket includes additional apertures and the pin is insertible into the additional apertures to adjust the angle of the harrow frame in the field-working position.

* * * * *